(12) United States Patent
Reimelt et al.

(10) Patent No.: US 8,196,465 B2
(45) Date of Patent: Jun. 12, 2012

(54) APPARATUS FOR ASCERTAINING AND MONITORING FILL LEVEL OF A MEDIUM IN A CONTAINER

(75) Inventors: Ralf Reimelt, Freiburg (DE); Dirk Osswald, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 702 days.

(21) Appl. No.: 11/991,648

(22) PCT Filed: Sep. 1, 2006

(86) PCT No.: PCT/EP2006/065935
§ 371 (c)(1),
(2), (4) Date: May 11, 2009

(87) PCT Pub. No.: WO2007/028775
PCT Pub. Date: Mar. 15, 2007

(65) Prior Publication Data
US 2009/0229359 A1 Sep. 17, 2009

(30) Foreign Application Priority Data
Sep. 7, 2005 (DE) .......................... 10 2005 042 646

(51) Int. Cl.
*G01F 23/28* (2006.01)
(52) U.S. Cl. .................................................. 73/290 V
(58) Field of Classification Search ................. 73/304 C, 73/304 R, 290 V
See application file for complete search history.

(56) References Cited

U.S. PATENT DOCUMENTS

| | | | | |
|---|---|---|---|---|
| 3,774,237 A * | 11/1973 | Hardway, Jr. | | 324/663 |
| 4,301,681 A * | 11/1981 | Maltby et al. | | 73/304 C |
| 4,489,601 A * | 12/1984 | Rao et al. | | 73/290 R |
| 4,511,948 A * | 4/1985 | Maltby et al. | | 361/280 |
| 5,391,839 A * | 2/1995 | Lang et al. | | 174/540 |
| 5,481,197 A * | 1/1996 | Sanders et al. | | 324/690 |
| 5,609,059 A * | 3/1997 | McEwan | | 73/290 R |
| 5,701,084 A * | 12/1997 | Borthwick et al. | | 324/690 |
| 6,192,752 B1 * | 2/2001 | Blaine | | 73/290 R |
| 6,928,867 B2 * | 8/2005 | Reimelt et al. | | 73/290 V |
| 7,249,504 B1 * | 7/2007 | Wendler | | 73/290 V |
| 7,255,002 B2 * | 8/2007 | Gravel et al. | | 73/290 V |
| 7,698,940 B2 * | 4/2010 | Osswald et al. | | 73/304 C |
| 7,814,789 B2 * | 10/2010 | Schroth | | 73/304 C |
| 2008/0134778 A1 * | 6/2008 | Osswald et al. | | 73/304 C |
| 2008/0307881 A1 * | 12/2008 | Schroth | | 73/304 C |

FOREIGN PATENT DOCUMENTS

| | | |
|---|---|---|
| DE | 2 120 407 | 12/1971 |
| DE | 197 56 159 C1 | 6/1999 |
| EP | 1 069 649 A1 | 1/2001 |
| WO | WO 98/25109 | 6/1998 |

* cited by examiner

*Primary Examiner* — John Fitzgerald
(74) *Attorney, Agent, or Firm* — Bacon & Thomas, PLLC

(57) ABSTRACT

An apparatus for ascertaining and monitoring the fill level of a medium in a container by means of a travel-time measuring method. The apparatus includes: A coupling unit for coupling measurement signals onto/from at least one conductive, first element extending into the container; a first securement element provided in the region of the coupling unit for securing the apparatus at the container; and a control/evaluation unit for ascertaining a fill-level measurement signal. The apparatus has a high transfer quality, while, at the same time, being mechanically and chemically stable.

10 Claims, 4 Drawing Sheets

APPARATUS FOR ASCERTAINING AND MONITORING FILL LEVEL OF A MEDIUM IN A CONTAINER

TECHNICAL FIELD

The invention relates to an apparatus for ascertaining and monitoring fill level of a medium in a container. The apparatus includes: A coupling unit for coupling measurement signals onto/from at least one conductive, first element extending into the container; a first securement element provided in the area of the coupling unit for securing the apparatus to the container; and a control/evaluation unit for ascertaining a fill-level measurement signal.

BACKGROUND DISCUSSION

Such apparatuses are to be found, for example, in measuring devices of process measurements technology. These measuring devices are frequently employed in automation and process control technology for measuring a process variable, such as e.g. limit level, fill level, dielectric constant or some other physical and/or chemical process variable during the course of a process. Produced and sold by the assignee, for example, are measuring devices under the marks Levelflex and Multicap, which are primarily designed for determining and/or monitoring fill level of a medium in a container. In one of many travel-time measuring methods, for example, according to the method of guided microwaves, time-domain reflectometry, also called the TDR measuring method, a high frequency pulse is transmitted along a Sommerfeld or Goubau waveguide, or coaxial waveguide, to then be partially reflected back at a discontinuity of the DK (dielectric constant) value of the medium surrounding the waveguide. From the time difference between transmitting of the high frequency pulse and the reception of the reflected, echo signal of the medium, fill level can be ascertained. The FMCW-method (Frequency Modulated Continuous Wave), in the case of which the frequency of a continuous measurement signal changes and the distance is measured by the frequency difference of the transmitted measurement signal compared to the reflected measurement signal, is likewise usable in connection with the above principle of measurement.

Another measuring principle used in a large number of measuring methods for ascertaining fill level in a container concerns measuring change in capacitance of a capacitive measurement assembly involving a measuring probe contacting the medium and a wall of the container or a reference electrode, when the degree of immersion of the probe in the medium, respectively fill level of the medium in the container, changes.

In both methods described above, a medium-contact fill-level measuring method is involved, wherein a measuring probe comes into direct contact with the medium to be measured. Such measuring probe is usually secured in a container at a process connection, opening or nozzle, so that the measuring electronics remains outside of the process, i.e. not in contact with the medium, and the measuring probe is integrated in the process. In the following references, construction of such measuring probes, respectively waveguides, and the coupling of the measurement signals into these measuring probes are discussed.

In EP 1 069 649 A1, the waveguide for a fill level measuring device is shown having a simple construction, which combines the advantages of single wire and known multi-wire waveguides, in that it shows no interaction with installed objects in the container and can be cleaned of accretions and deposits in simple manner. This is achieved by surrounding the multi-wire waveguide in the process at least partially with a dielectric medium, so that no accretion can form between the individual waveguides.

In DE 100 27 228 A1, a form of embodiment of the coupling of high frequency signals into a surface waveguide is shown. In this document, coupling is embodied in such a manner that disturbance voltages are effectively bled off, since the surface waveguide is connected via a coupling to ground potential.

In DE 100 19 129 A1, several types of coupling units are disclosed, which are so lengthened that the structural parts lie outside of the area in which electromagnetic energy is radiated. In this way, the influence, which a structural part or accretion formation on the sensor has on accuracy and sensitivity of measurement, can be largely eliminated.

SUMMARY OF THE INVENTION

An object of the invention is to provide a cost-favorable, efficient coupling of high transfer quality, while being, at the same time, mechanically and chemically stable.

Such object is achieved according to one form of the invention by the features that the coupling unit has a platform of a dielectric material and that at least one conductive, second element is embedded in the platform, so that the conductive first element and the conductive second element are galvanically separated from one another and from the container in the region of the platform. The conductive second element is embodied, for example, as a tubular, shielding conductor, which is positioned in the coupling region in the platform coaxially with, and galvanically separated around, the conductive, first element, in order to form a multi-conductor system. The conductive second element is surrounded on the process-side completely by the material of the platform and, thus, is not process-contacting, whereby no sealing elements need be introduced between the platform and the conductive second element and no highly resistant material, such as VA steel, can be used. The conductive, second element is, for example, embodied as a simple stamped sheet metal part or as a wire braid product. If the platform is modularly constructed, an option is to provide a molded part corresponding to the conductive, second element, the molded part being provided with a conductive, e.g. metal, coating via a coating process.

In an especially preferred form of embodiment of the invention, it is provided that the container is made of a conductive material or that, in the case where the container is made of a non-conductive material, the container has, at least in the extended region of the securement element, a conductive coating. In order that an optimized coupling of the measurement signal is achieved from a multi-conductor system having, for example, a TEM-mode structure, onto the measuring probe having, for example, a $TM_{01}$-mode structure, it can be advantageous to have the container be of an electrically conductive material. The roof region of the conductive container, around the process connection of the measuring apparatus, acts as a reflector, so that more signal intensity of the measurement signal is coupled at the interface of multi-conductor system onto the measuring probe, i.e. less signal energy is lost. By this measure, the ratio between transmission and reflection of the coupled measurement signals at the transition from the multi-conductor system onto the measuring probe is strongly increased, respectively improved. On this basis, the accuracy and sensitivity of the measuring apparatus is significantly increased. If the container is not made of a conductive material, it is still possible, using a coating process, e.g. application of a conductive lacquer onto the outer or inner surface of the container, to obtain the above-described effect. This embodiment with a conductively coated container of a dielectric base material is also advantageous in the case of a measuring probe with a usual coupling unit of the state of the art, made of a metal platform.

In an advantageous form of embodiment of the solution of the invention, it is provided that a first coupling region, located in the region of the securement element between the outer surface of the conductive, second element and the container, is so sized that an optimized electromagnetic coupling of the measurement signal is achieved while still maintaining sufficient mechanical stability of the platform. An electromagnetic coupling between the conductive, second element and the conductive container can be optimized by making the coupling surface as large as possible and the separation of the coupling elements as small as possible; however, use of this provision must be balanced against the need for mechanical stability of the platform.

A helpful embodiment of the apparatus of the invention contains the features that the first coupling region for the electromagnetic coupling is so constructed in structure, form, coupling area and/or gap breadth, that essentially a defined mode of the measurement signal forms in a coupling region between the conductive, first element and the conductive, second element and/or in a measuring region of the conductive, first element.

An advantageous embodiment of the solution of the invention provides that the conductive element is composed of at least two subcomponents, an inner conductor and a measuring probe. On the basis of this two-part embodiment of the conductive, first element, it is easily possible to replace the measuring probe at the apparatus.

In an advantageous embodiment of the apparatus of the invention, it is provided that a second coupling region for electromagnetic coupling of the measurement signals is formed in the region between the first subcomponent and the second subcomponent. The inner conductor of the first conductive first element and the outer conductor of the conductive, second element is surrounded completely by the material of the platform and, thus, embodied completely separated from the process. In this way, no sealing element need be introduced between the conductive, first element, the conductive, second element and the housing platform for sealing the coupling unit against process media; in this way, a sealing freedom of the coupling unit is achieved.

An especially advantageous embodiment of the apparatus of the invention provides that the two subcomponents are mechanically connectable together by means of a securement and positioning element and that the securement and positioning element is embedded in the platform of the coupling unit.

An advantageous embodiment of the solution of the invention provides that the platform of the coupling unit is embodied modularly or in a plurality of parts.

A very advantageous variant of the solution of the invention provides that the platform of the coupling unit is embodied as one piece.

An especially advantageous, further development of the solution of the invention provides that the conductive, first element and the conductive, second element is/are formed of metal, an electrically conductive plastic and/or metallically or conductively coated parts of a dielectric material.

Another advantageous embodiment of the apparatus of the invention provides that the dielectric material comprises a plastic amenable to processing preferably in an injection molding process, and/or a ceramic.

In an advantageous embodiment of the apparatus of the invention, it is provided that the conductive, second element has openings, with the openings being at least partially filled by the dielectric material of the platform. By the filling of the openings, mechanical forces, e.g. tensile forces, which can arise in the region between the conductive, first element and the conductive, second element on the basis of, for example, tensile forces on the measuring probe, are diverted outwardly, respectively toward the process connection. In this way, it is prevented that, at the locations where the platform surrounds the embedded, conductive, second element on the process side, mechanical force effects bring about elevated notch- and shear-forces, which could otherwise lead to a fatigue fracture or bursting of the platform at these locations.

BRIEF DESCRIPTION OF THE DRAWINGS

In the examples of embodiments of the invention presented in the figures, towards the goals of better overviewability and simplification, components or assemblies of components equal in construction and/or function are provided with equal reference characters. The figures show as follows.

DETAILED DISCUSSION

Figure 1:
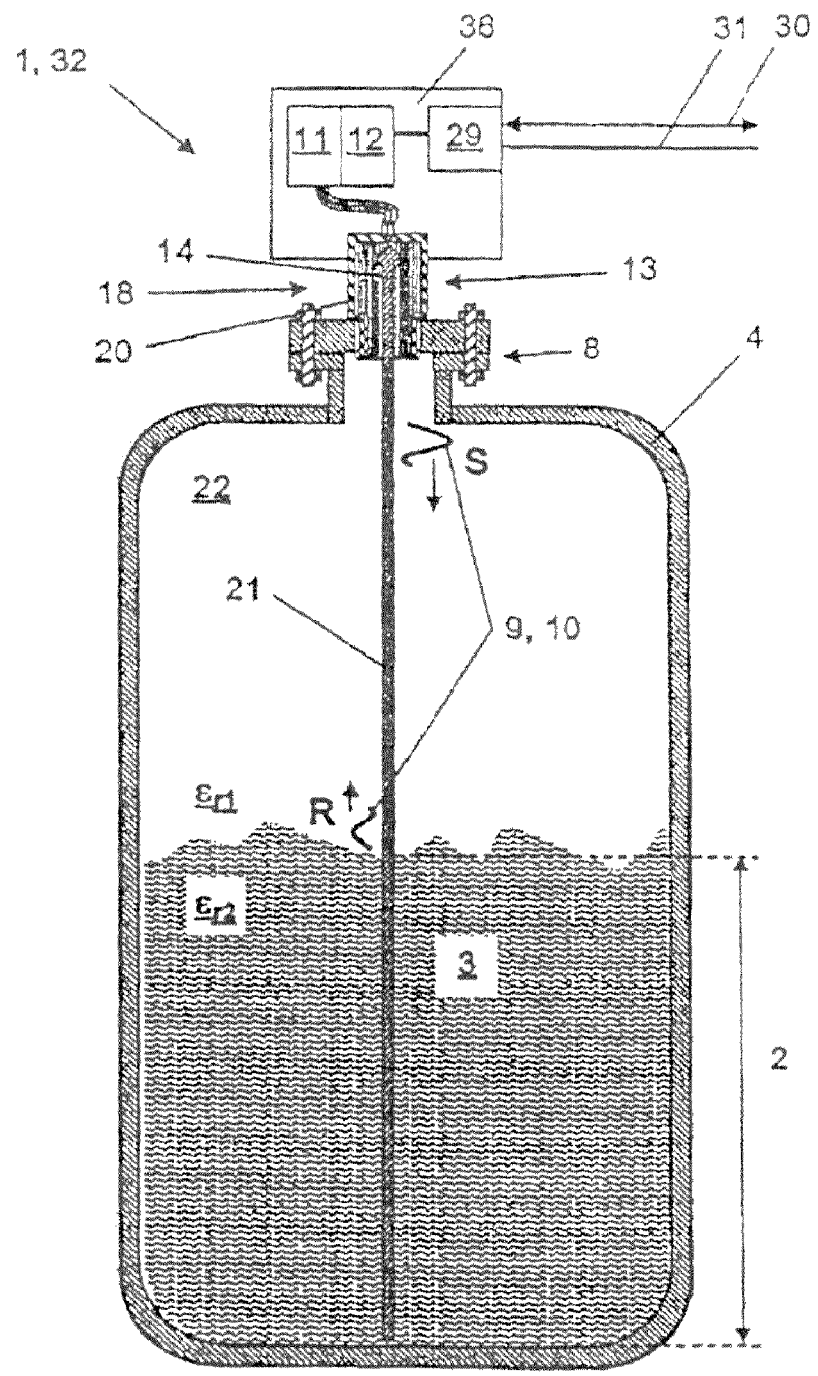
FIG. 1 a schematic total view of a time-domain reflectometer of the state of the art, with a Sommerfeld waveguide.

FIG. 1 shows an example of use of the apparatus 1 of the invention as a time-domain reflectometer 32, or TDR (Time Domain Reflectometry) measuring system, for ascertaining continuous fill level 2 of a medium 3 in a container 4. Such an apparatus 1, or such a measuring device, for determining fill level 2 is also referred to in automation and process technology as a field device. This measuring device is mounted on a process connection 8, such as e.g. a nozzle, on the container 4, and the measuring probe with the rod- or cable-shaped measuring probe 21 is introduced via a coupling unit 13 in the form of a coaxial conductor 18a through the region of the process connection 8 into the measuring space of the container 5.

The TDR measuring method works according to the following measuring principle: Via the measuring probe 21, electromagnetic waves 9, guided by the skin-effect in the vicinity of and on the surface of the measuring probe 21, are transmitted in the direction of the medium 3, respectively the process space 22. These electromagnetic waves 9 are partially reflected back at a jump in DK-value, i.e. a discontinuity of the dielectric factor $\in_r$, of the surrounding medium 3 and a change of the wave resistance associated therewith. This discontinuity is, for example, present, when the dielectric constant $\in_{r1}$ of the gas phase, especially air ($\in_{r1} \approx 1$), above the medium 3 is smaller than the dielectric constant $\in_{r2}$ of the medium 3. Via the measured travel time of the electromagnetic waves 9, using a conversion by way of the formula for the wave velocity, the traveled distance is ascertained. This segmental distance corresponds to the height of the container 4 minus the fill level 2 of the medium 3 in the container 4. Since the height of the container 4, respectively the position of the coupling of the electromagnetic wave 9, is known, the fill level 2 in the container 4 can, therefore, be determined.

The electromagnetic waves are produced in the transmitting/receiving unit 11, for example, as pulses with a band width of 0-1.5 GHz, and are coupled as a transmission signal S by means of a coupling unit 13 into a Sommerfeld waveguide 21. Also usable are Goubau waveguides 21, coaxial conductors 18a, microstrip conductors or coaxial and parallel arrangements of several waveguides, respectively measuring probes 21, which are, however, not shown explicitly in the drawing. The reflection signals R traveling back on the waveguide 21 due to the discontinuity of the dielectric constant $\in$ of the surrounding medium 3 are, in turn, received and preprocessed in the transmitting/receiving unit 11. These preprocessed measurement signals 10 are then evaluated metrologically and signal-technologically in the control/evaluation unit 12 and so conditioned that the measured value of the fill level 2 or an echo curve signal representing the conditioned envelope of the measurement signal 10 is forwarded via a bus interface 29 on the fieldbus 30 to a control station.

The measured value of the fill level 2 or the echo curve signal can also be presented on an integrated display or an output/input unit (not shown) of the apparatus 1. Energy, or power, supply 31 of the apparatus 1, or the measuring device, as the case may be, is implemented, for example, by means of a two-wire line. The line for the energy supply 31 is not needed, when the measuring device, or the apparatus 1, as the case may be, is a two-conductor measuring device, whose communication via the fieldbus 30 and energy supply 31 are accomplished exclusively and simultaneously via one two-wire line. Data transmission, or communication, via fieldbus 30 is accomplished, for example, according to the CAN-, HART-, PROFIBUS DP-, PROFIBUS FMS-PROFIBUS PA-, or FOUNDATION FIELDBUS-Standard.

FIG. 1 shows a time-domain reflectometer 32 for determining fill level 2 of a medium 3 in a container 4. Reflectometer 32 includes a measuring probe 21 in the form of a rod or cable, representing a surface waveguide 21, which conducts the electromagnetic waves. This form of embodiment of the apparatus 1 can also be used as a capacitive measuring system for determining fill level 2 of a medium 3 in a container 4, with the capacitance between the measuring probe 21 and a reference electrode or the inner wall 6 of the container 4, as ascertained by a measuring signal 10, being dependent on fill level 2 and the dielectric number $\in_r$ of the medium 3.

Figure 2:
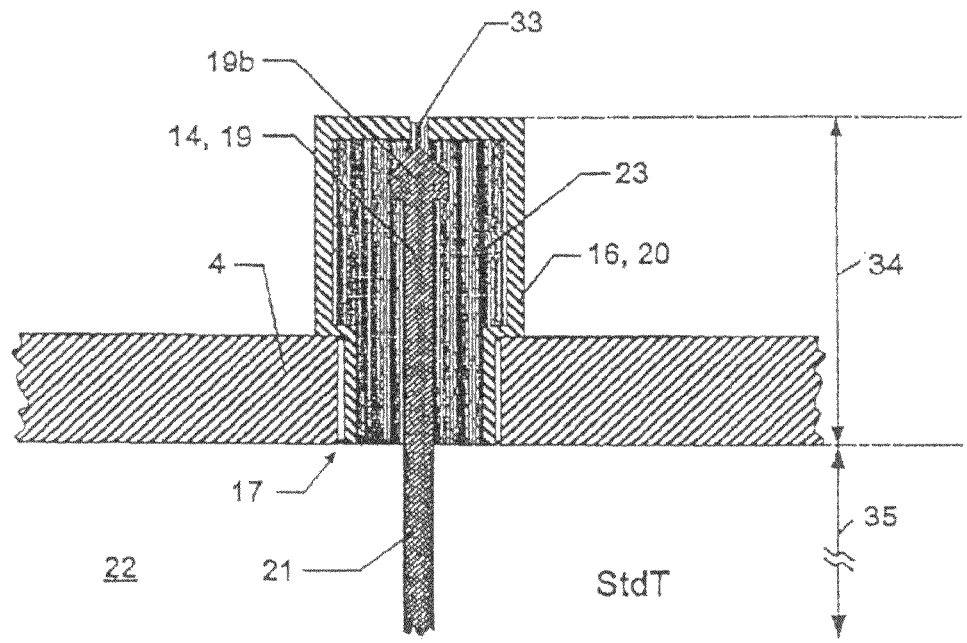
FIG. 2 a longitudinal section of the coupling unit of the state of the art.

FIG. 2 shows a longitudinal section through a coupling unit 13 according to the state of the art. Platform 16 is made of an electrically conductive material 24, such as metal. Platform 16, as outer conductor 20, forms, together with the inner conductor 19 (the conductive, first element 14, respectively the wave guide 21), a coaxial conductor 18a in the coupling region 34. Via a securement element 17, e.g. screw threading, platform 16 is connected with the container 4. If a conductive, or metal, container 4a is used for storing the medium 3, then there is, furthermore, via the securement element 17, an electrically conducting contact between platform 16 and the conductive or metal container 4a. Via a coaxial plug connection 33, the measurement signal 10 is coupled out of and in to the inner conductor 19, respectively the conductive, first element 14. Inner conductor 19 is mechanically held and fixed in the platform 16 particularly by an inner conductor thickening 19b. Due to the coaxial form of the coupling region 34, a TEM mode of the coupled measurement signal 10 forms there. This mode represents a preferred form for almost lossless and disturbance-free forwarding of the coupled measurement signal 10. In the measuring region 35 of the waveguide 21, for optimum measurement of the fill level 2 of a medium 3 in a container 4, formation of a $TM_{01}$-mode in the near-region of the waveguide 21 is achieved by the fact that the transition from the conductive platform 16 to the conductive or metal container 4 a represents an expansion by 180° of the outer conductor 20, respectively the conductive, second element 15. The tank roof has, because of the electric contact with the platform 16, the effect of a reflector following on the coupling region 34, whereby less energy is lost in the transition from the coaxial conductor 18a in the coupling region 34 to a single waveguide 21 in the measuring region 35. The tank roof acts as a strong reflector especially at low frequencies. With this feature, at least twice the measurement energy can be in- and out-coupled at the waveguide 21 and the measuring sensitivity of the apparatus 1 is increased.

Figure 5:
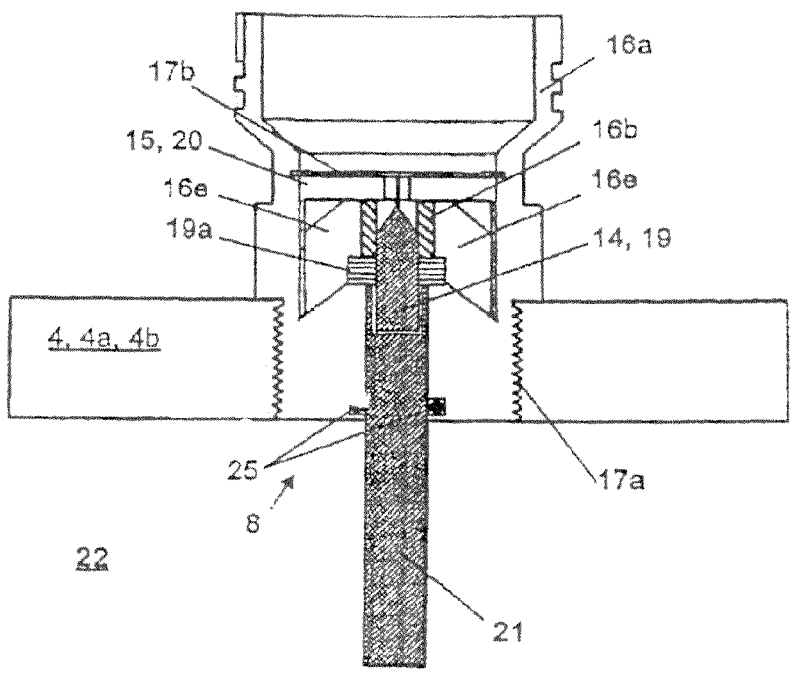
FIG. 5 a longitudinal section of the coupling unit according to a third form of embodiment.
Figure 6:
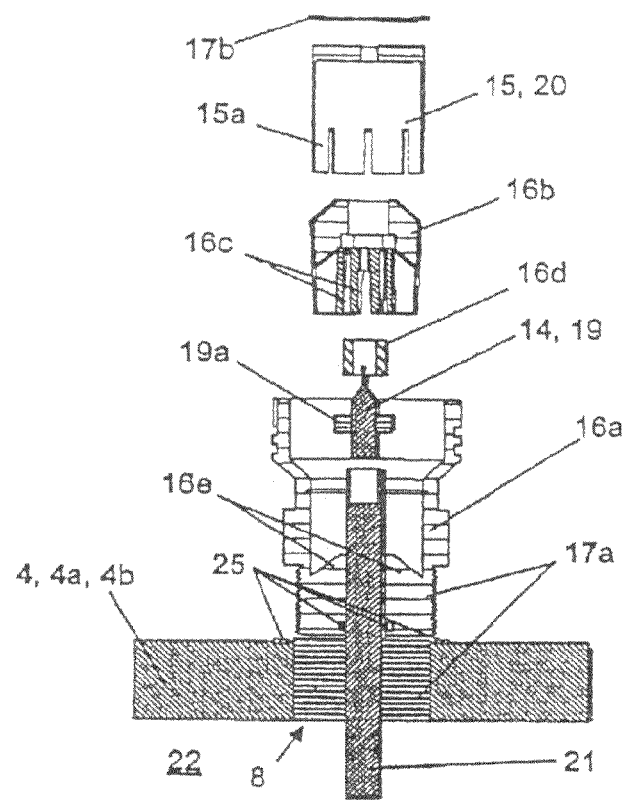
FIG. 6 an exploded view of the coupling unit of the third form of embodiment; und FIG. 7 a three dimensional, exploded view with partial sectioning of the coupling unit according to a third form of embodiment.

For reasons of process sealing, it is necessary to provide a sealing element 25 between each material transition directly contacting the process space 22, i.e. e.g. from inner conductor 19 and/or outer conductor 20 to the dielectric material 23. Sealing elements 25 are not shown in FIG. 2, but are indicated in FIGS. 3, 5 and 6.

Figure 3:
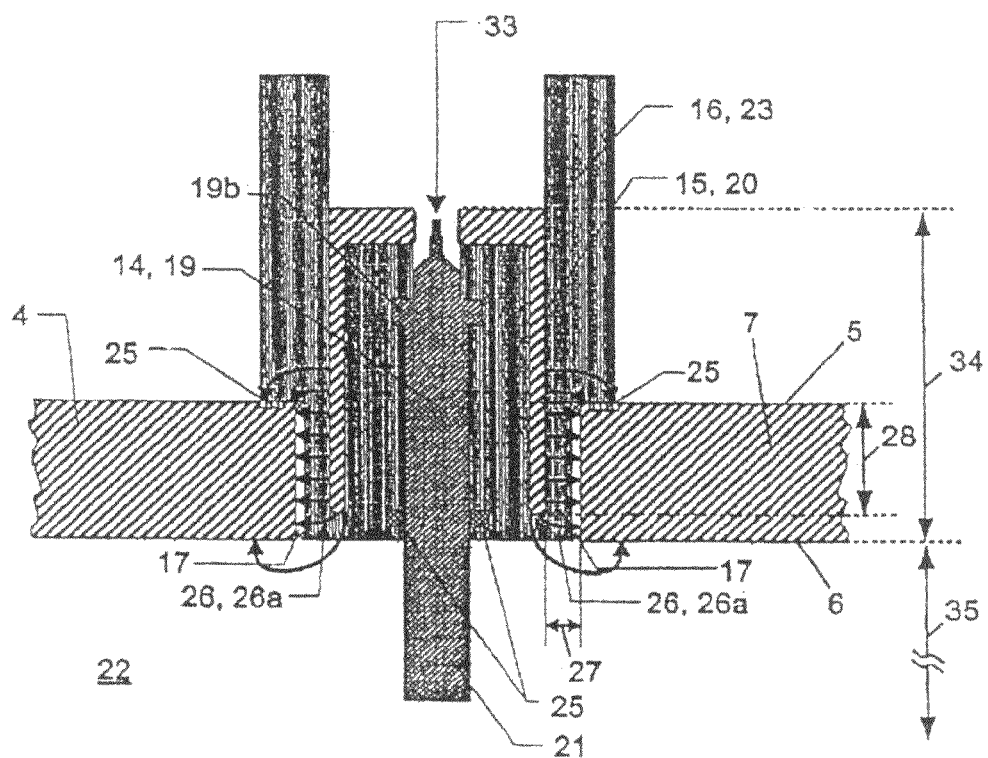
FIG. 3 a longitudinal section of the coupling unit according to a first form of embodiment.

FIG. 3 shows a longitudinal section through a first coupling element 13 of the invention. Platform 16 is, in this case, made of a dielectric material 23. Via a securement element 17, e.g. screw threading, platform 16 is connected securely mechanically with the container 4 and a sealed thereto by sealing elements 25 hermetically and also for media 3. In the coupling region 34 of the coupling unit 13, the measuring probe, or waveguide, 21, is provided in the form of a multi-conductor system 19 having an outer conductor 20 and an inner conductor 19, especially to form thereby a coaxial conductor 19a. Inner conductor 19 is held mechanically fixed in the platform 16 especially by an inner conductor thickening 19b. Via a coaxial plug connection 33, the measurement signal 10 is coupled out of and in to the inner conductor 19, respectively the conductive, first element 14. Inner conductor 19 of metal or other conductive material 24 is embedded in the platform 16 of a dielectric material 23 and hermetically sealed between the two materials 23, 24 by a sealing element 25, e.g. an O-ring. Construction of the platform 16 of the coupling unit 13 out of a dielectric material 23 has the advantage that the cost-intensive metal platform 16 of FIGS. 1 and 2, which is quite complicated to manufacture, can be replaced with cost-favorable materials, e.g. plastics or ceramics using a simple and cost-favorable manufacturing method, e.g. injection molding, hot stamping, casting, pressing or rapid prototyping. By this above-described construction of decoupling unit 13, much energy of the measurement signal 10 coupled into the conductive, first element 14, would be lost in the area of the securement element 17, since, there, with the use of a conductive or metal container 4a, the measurement signal 10 experiences a strong back reflection. Furthermore, due to these factors, no desired mode, e.g. a $TM_{01}$-mode, can be formed in the measuring region 35 of the conductive, first element 14.

In order to be able to form in the coupling region 34 a desired TEM-mode of the coupled measurement signal 10, an outer conductor 20 must be placed in or on the dielectric platform 16. If one places by a method, e.g. vapor deposition, a metal or conductive material 4a on the outer surface of the platform 16, then, it is true, an outer conductor 20 has been created, but this coating is not mechanically or chemically especially stable. This form of embodiment it is not shown in the figures.

Another option is to embed a conductive, second element 15 arranged in the platform 16 and galvanically separated from the conductive, first element 14, so that a first coupling region 26a is formed between a metal or conductive container 4a and the conductive, second element 15 over a coupling area 28. The gap width 27 and the coupling area 28 of this first coupling region 26a are so chosen that an optimum electromagnetic coupling 26 is obtained at sufficient mechanical stability of the platform 16 in the face of tensile and shear forces from mechanical loading of the conductive, first element 14. In this way, there is achieved an optimum transfer of the coupled measurement signal 10 into the conductive, the first element 14 from the coaxial conductor 18a with a developed TEM-mode of the measurement signal 10 in a coupling region 34 onto a Sommerfeld or Goubau waveguide 21 with a developed $TM_{01}$-mode of the measurement signal 10 in the measuring region 35, as already described with reference to FIG. 2. The conductive, second element 15 is completely embedded in the dielectric material 23 of the platform 16, so that no additional sealing element 25 needs to be placed between these parts 23, 25 for maintaining the hermetic process sealing.

Coupling unit 13 should couple as much intensity of the measurement signal 10, or intensity of the electromagnetic wave 9, as possible into the measuring probe 21, in that, by reason of the inventive structure of the coupling unit, the measurement signal 10 is scarcely reflected back in the transition from coaxial conductor 18a or multi-conductor 18 onto a single conductor, or measuring probe, 21. The ratio of transmission to reflection of measurement signal 10

If the container 4b is made of a non-conductive material, then, by application of a conductive coating on the outer wall 5, inner wall 6 or in the interior of the wall 7 in the region of the process connection 8 or the roof of the container 4b, a first coupling region 26a can be produced. In this way, as already described above, an improved transfer of the measurement signal 10 from the multi-conductor system 18 onto the measuring probe 21 is achieved on the basis of the reflection characteristics of the conductive or conductively-coated roof of the container 4.

Figure 4:
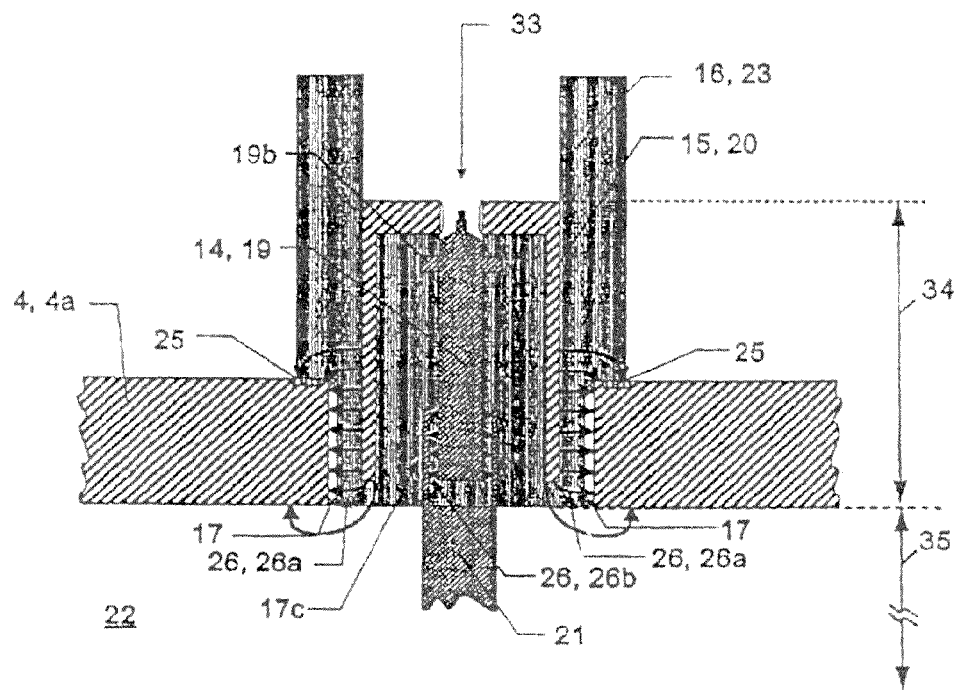
FIG. 4 a longitudinal section of the coupling unit according to a second form of embodiment.

FIG. 4 shows a longitudinal section through a form of embodiment of a coupling unit 13 of the invention. This coupling unit 13 is almost the same as that of FIG. 3. The difference lies in the fact that, here, also the inner conductor 19 is embodied in two parts, to provide a second coupling region 26b. By providing a two-part, galvanically separated, inner conductor 19, sealing freedom of the coupling unit 13 is achieved, i.e. no additional sealing element 25 is needed for maintaining the hermetic process sealing. The waveguide 21 or the measuring probe 21 is locked and positioned in the platform 16 coaxially with the inner conductor 19 embedded in the dielectric material 23 via a securement and positioning element 17c, e.g. a threaded connection or a bayonet connection, either of which is not shown in detail. The securement and positioning element 17c on the measuring probe 21 and on its counterpiece in the platform 16 are so embodied that the measuring probe 21 is, on the one hand, embodied to be releasable from the coupling unit 13, so that the measuring probe 21 can be replaced, and, on the other hand, the mechanical stability of the securement and positioning element 17c is established, so that forces acting on the measuring probe 21 are accommodated or canceled.

The second coupling region 26b from the inner conductor 19 onto the waveguide, or measuring probe, 21 with the securement and positioning element 17c is so embodied that, for the utilized transmission frequency of the measurement signal 10, an optimized electromagnetic coupling 26 is achieved and a good mechanical stability of the securement apparatus is effected.

Figure 7:
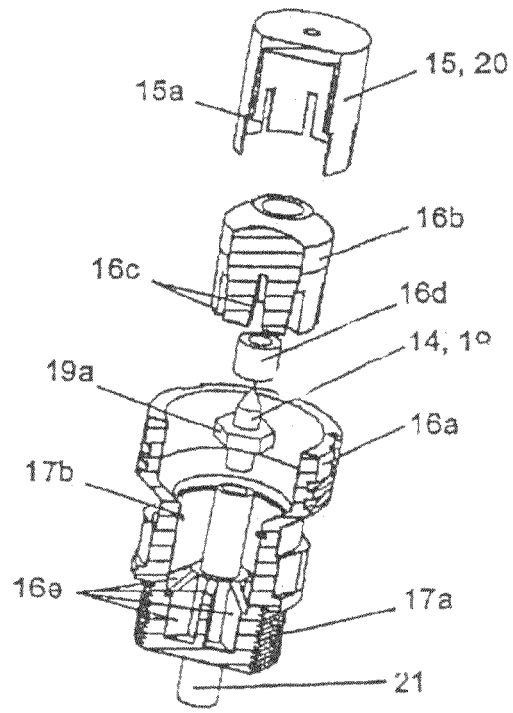

FIGS. 5, 6 and 7 show a third embodiment of the coupling unit 13 of the invention. The figures present, respectively, a longitudinal section, an exploded, longitudinal section, and a partially sectioned, exploded drawing. In this form of embodiment, platform 16 and/or the inner conductor 19 are made modularly of separate portions. Platform 16 of dielectric material includes, for example, a support member 16a, a fill member 16b and a separating sleeve member 16d. Support number 16a establishes the outer form of the coupling unit 13 and serves for securement of the coupling unit 13 via a securement element 17, e.g. a threaded region 17a, in a process connection 8 of the container 4. Support member 16a is advantageously modularly embodied and includes a process adapter and a measuring-electronics-housing adapter which are mechanically joinable together via a connecting element. This is not shown in detail in the figures. This embodiment has the advantage that, depending on process connection 8 and measuring-electronics-housing 36 of the support member 16a of the platform 16, the modular construction enables a multitude of combinations of process adapters and measuring-electronics-housing adapters.

Measuring probe, respectively waveguide, 21 is embedded centrally in this support member 16a and sealed via a sealing element 25. Via an inner conductor threading 19a, inner conductor 19 is electrically and mechanically connected with the waveguide, respectively measuring probe, 21. Separating sleeve member 16d is pushed over the upper part of the inner conductor 19 and holds the fill member 16b with the cavities 16c centered. Cavities 16c in the fill member 16b are embodied in such a manner that fill member 16b and the conductive, second element 15 surrounding it can be assembled in a shape-interlocking manner onto the struts 16e of the support member 16a. The modular assembly of the platform 16 and the conductor, guiding the measurement signal 10 and composed of the inner conductor 19, waveguide 21, separating sleeve member 16d, fill member 16b and outer conductor 20, are held locked in the support member 16a by a retaining ring 17b.

Struts 16e lend to support member 1a and, thus, to the entire coupling unit, a greater mechanical stability and stiffness, in that tensile and shear forces acting on the inner conductor 19 and waveguide 21 are transferred from these to the platform 16, as absorbed by the struts 16e. The openings, such as slots, 15a necessitated thereby, in, for example, the tubular, conductive, second element 15, have only a small effect on the electromagnetic coupling 26 by means of the first coupling region 26a between the outer conductor 20 and the conductive or metal container 4b. Due to these openings 15a in the tubular, conductive, second element 15 or in the case of use of an outer conductor 20 in the form of two shielding conductors arranged parallel to the inner conductor 19, an option is to extend the outer conductor 20 into the measuring region 25 and thus form a coaxial or parallel arrangement of a plurality of measuring probes, or waveguides, 21, so that the mechanical stability of the apparatus is further supported.

The invention claimed is:

1. An apparatus for ascertaining and monitoring fill level of a medium in a container, comprising:
   at least one conductive first element;
   a coupling unit for coupling measurement signals onto and/or from said at least one conductive first element extending into the container;

a first securement element provided in a coupling region of said coupling unit for securing the apparatus at the container;

a control/evaluation unit for ascertaining fill level from the measurement signals, wherein said coupling unit includes a platform of a dielectric material, and at least one conductive second element is embedded in said platform, so that said conductive first element and said conductive second element are galvanically separated from one another in the coupling region of said platform, as well as being galvanically separated from the container; and a first coupling region located by said first securement element between an outer surface of said conductive second element and the container is so sized, that an electromagnetic coupling of the measurement signal is provided, combined with sufficient mechanical stability of said platform, wherein:

said first coupling region for electromagnetic coupling is embodied in structure, form, coupling area and gap width in such a manner that an optimum transfer of the coupled measurement signal into the conductive first element from a coaxial conductor with a developed TEM-mode of the measurement signal in a first coupling region onto a single rod waveguide with a developed TM01-mode of the measurement signal in the measuring region is achieved.

2. The apparatus as claimed in claim 1, wherein:
the container comprises one of: a conductive material, and a conductive coating, at least in an extended vicinity of said first securement element.

3. The apparatus as claimed in claim 1, wherein:
said conductive first element is composed of at least two subcomponents, an inner conductor and/or a measuring probe.

4. The apparatus as claimed in claim 1, wherein:
said platform of said coupling unit is embodied modularly or in a plurality of parts.

5. The apparatus as claimed in claim 1, wherein:
said platform of said coupling unit is embodied as one part.

6. The apparatus as claimed in claim 1, wherein:
a second coupling region for electromagnetic coupling of the measurement signals is formed between an inner conductor as first subcomponent and a measuring probe as second subcomponent.

7. The apparatus as claimed in claim 6, wherein:
said inner conductor as first component and said measuring probe as second subcomponent are connectable together by means of a securement and positioning element, and said securement and positioning element is embedded in said platform of said coupling unit.

8. The apparatus as claimed in claim 1, wherein:
said conductive first element and/or said conductive second element comprise/comprises a metal, an electrically conductive plastic and/or metal or conductively coated parts of a dielectric material.

9. The apparatus as claimed in claim 8, wherein:
said dielectric material comprises an injection-moldable plastic and/or a ceramic.

10. An apparatus for ascertaining and monitoring fill level of a medium in a container, comprising:

at least one conductive first element;

a coupling unit for coupling measurement signals onto and/or from said at least one conductive first element extending into the container; and a control/evaluation unit for ascertaining fill level from the measurement signals, wherein:

said coupling unit includes a platform of a dielectric material, and at least one conductive second element is embedded in said platform, so that said conductive first element and said conductive second element are galvanically separated from one another in the coupling region of said platform, as well as being galvanically separated from the container;

said conductive first element and/or said conductive second element comprise/comprises a metal, an electrically conductive plastic and/or metal or conductively coated parts of a dielectric material; and said conductive second element has openings at least partially filled by said dielectric material of said platform.

* * * * *